Dec. 24, 1957     R. L. CHANDLER     2,817,241
ACTUATING MECHANISM
Filed May 29, 1952     2 Sheets-Sheet 1
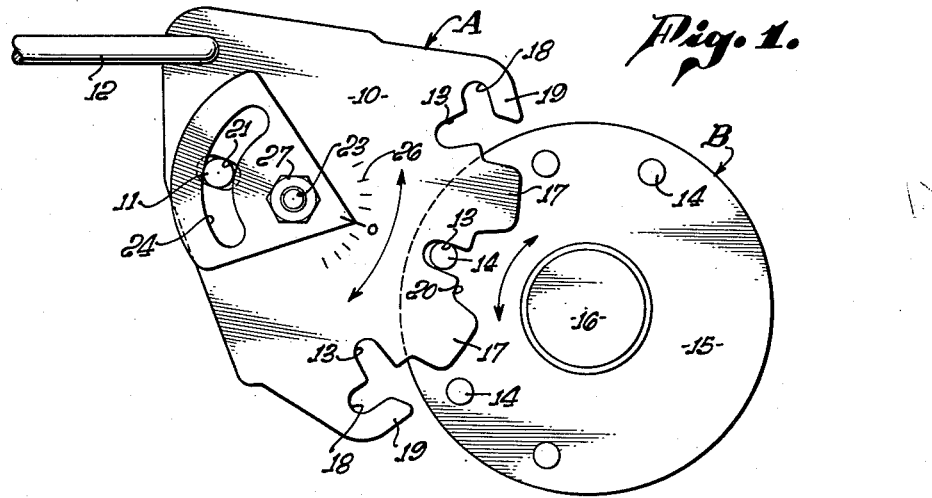
Fig. 1.
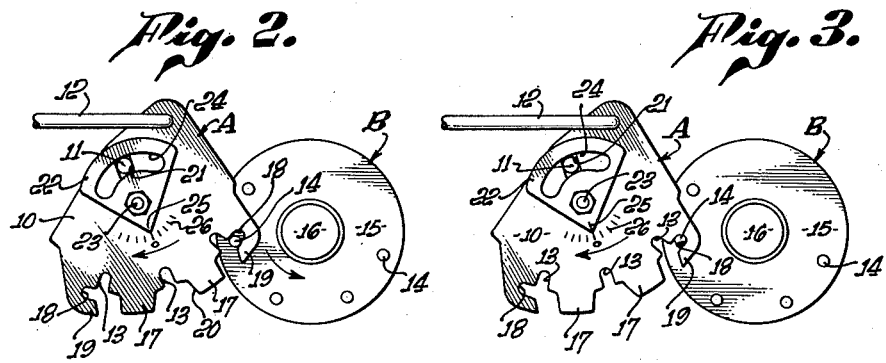 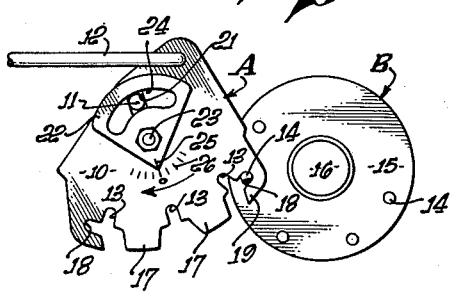
Fig. 2.     Fig. 3.
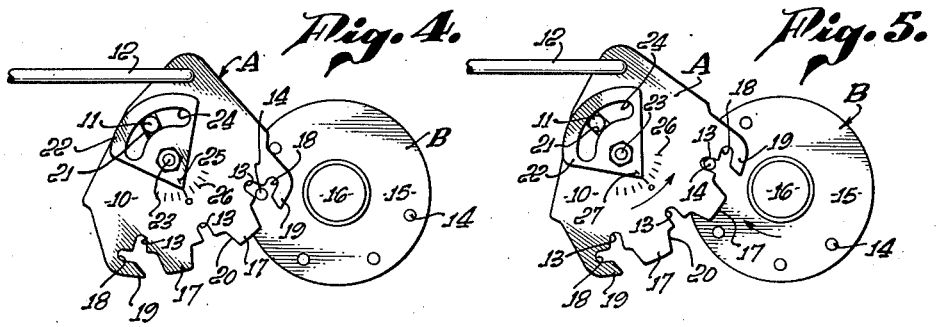 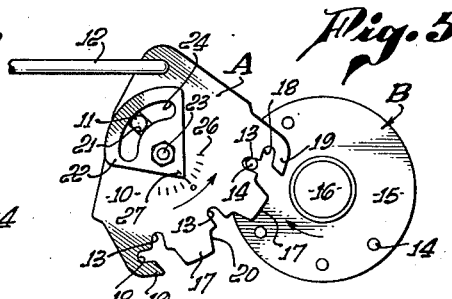
Fig. 4.     Fig. 5.
Roy L. Chandler,
INVENTOR.
BY
Attorney.

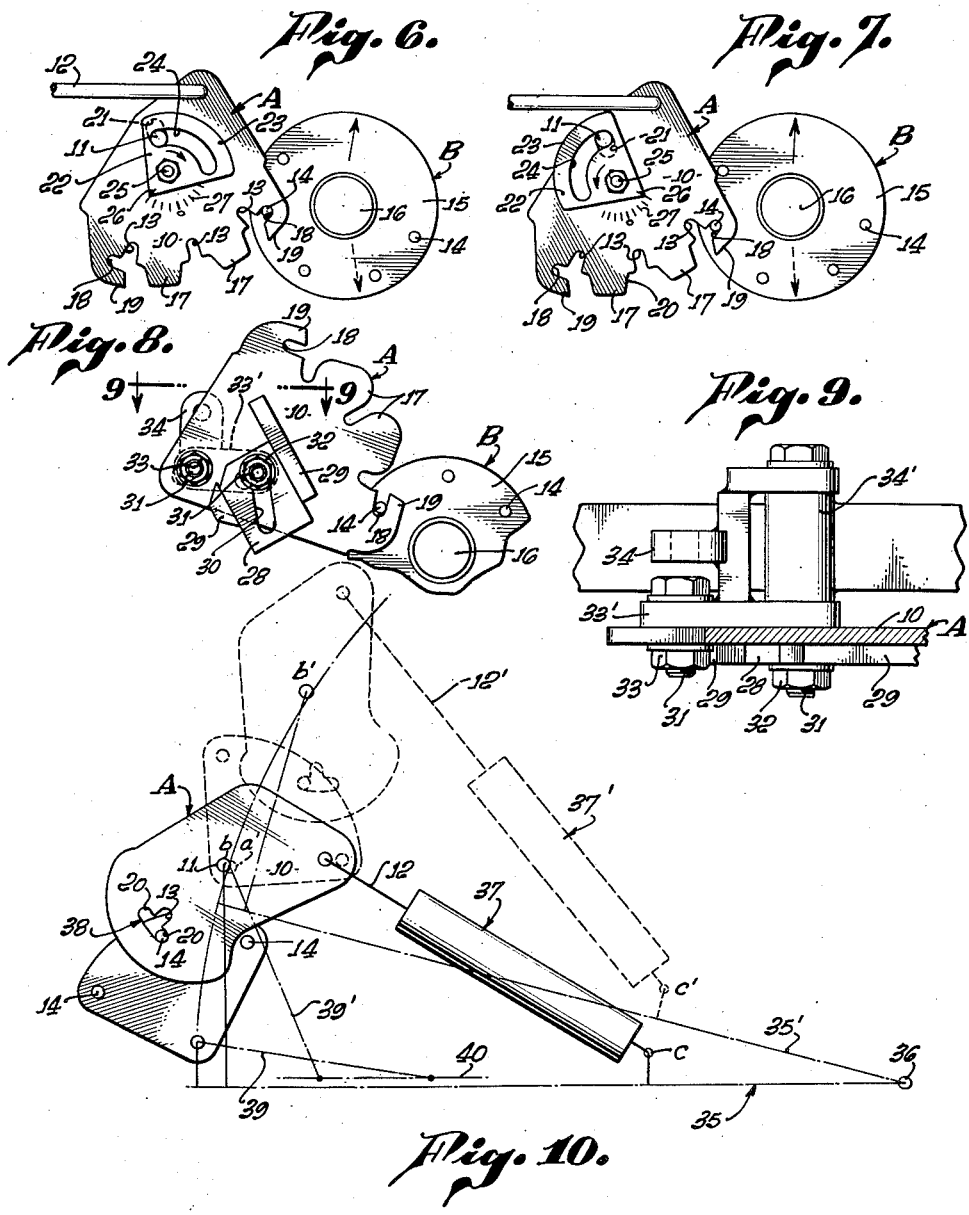

United States Patent Office 2,817,241
Patented Dec. 24, 1957

2,817,241
ACTUATING MECHANISM
Roy L. Chandler, Bell, Calif.
Application May 29, 1952, Serial No. 290,737
19 Claims. (Cl. 74—96)

The present invention relates generally to an actuating mechanism having general application; and is more particularly concerned with a device by means of which a driven member or structure may be moved between predetermined limits by a driving member, and upon being moved to a limiting position is locked against independent movement, but which may be moved in a reversed direction away from the locked position at any time by means of the driving member.

It is one object of the invention to provide an actuating mechanism of the herein described character for moving structures with a rotary motion, usually through a partial revolution between limiting positions. Such a mechanism is susceptible of wide and varied uses. For example, the invention may be utilized in connection with charging and dumping equipment, tilting of platform and frame structures, raising and lowering of various types of tools, axially rotating a tool carrier to position a carried tool, and the like.

Still another object is to provide a novel tilting mechanism which may be mounted upon and carried by a tiltable structure, and which includes an expansible and contractable power link.

It is also an object to provide an actuating mechanism by means of which a driving member may be actuated to move a driven member through a limited rotation, and yet includes a driving connection which is so arranged that the driven member may be locked against reversed movement at points intermediate the limiting positions.

A further object resides in the provision of a novel actuating mechanism having unique means for adjusting the extent of limited movement between a driving and driven member.

Further objects of the invention will be brought out in the following part of the specification, wherein detailed description is for the purpose of fully disclosing several embodiments of the invention without placing limitations thereon.

Referring to the accompanying drawings, which are for illustrative purposes only:

Fig. 1 is a view showing an actuating mechanism embodying the features of the herein described invention, the parts being shown in intermediate or mid-position of operation;

Fig. 2 is an operating view showing the driven member in stopped position;

Fig. 3 is a similar view showing the locked position of the driven member;

Fig. 4 is a similar view showing the released position of the driven member;

Fig. 5 is a view illustrating the beginning of reversed movement of the driven member;

Figs. 6 and 7 are views illustrating the adjustment of the mechanism for small and large limits of movement of the driven member, respectively;

Fig. 8 is a view illustrating modified means for adjusting the limits of angular movement of the driven member;

Fig. 9 is a fragmentary sectional view, taken substantially on line 9—9 of Fig. 8; and Fig. 10 is a modified arrangement as used for actuating a tiltable structure, and including a power expansible and contractable linkage.

For illustrative purposes, the actuating mechanism of the present invention is disclosed in Fig. 1 as comprising a driving member A and a driven member B which are interconnected in a manner to be subsequently explained so that pivotal movements of the driving member will operate to cause pivotal movement of the driven member, in the present instance through a partial revolution extending between limiting positions.

More specifically, the driving member is shown as embodying a substantially triangular plate 10, although plates of other configurations in certain arrangements may be utilized.

The plate 10 is supported for pivotal movement upon a fixed pivot 11, and has connected thereto an actuating link 12 which is connected with a suitable power device, such as a hydraulic cylinder (not shown).

On the opposite side of the pivot 11, from that on which the link 12 is connected, the plate 10 is formed with a curved edge which is provided with spaced indentations 13 which extend generally in a radial direction from the pivot 11 and open outwardly for driving cooperation with suitable projections, such as the pins 14 which are circumferentially spaced on a marginal section of the driven member, the driven member in this instance being shown as comprising a disc 15 which may be carried by a shaft 16.

The spacing between the indentations 13 defines spaced lobes 17 which are adapted to successively extend between the pins 14 of the driven member, when the driving member is rotated. Concerted movement of the driving and driven members is limited by providing at each end indentation 13 on the plate member 10 a laterally extending notch 18 which results in the formation of a hook-shaped finger 19 for arresting movement of the members at the limit positions. Moreover, it will be observed that the outer end portions of the lobes 17 are in each case reduced in width so as to provide edge shoulders 20 at the entrances to the indentations 13, for a purpose which will be explained subsequently.

It is believed that the operation of the actuating mechanism as thus far described will be more clearly understood by reference to Figs. 2 to 5 inclusive of the drawings. As shown in Fig. 1, the driving member A and driven member B are shown in an intermediate or mid-position between their limits of movement, in which case one of the pins 14 is seated in the central or middle indentation 13 of the driving member. From this point, of course, the driving member may be rotated in either direction to cause a corresponding movement of the driven member. For purposes of illustration, let it be considered that the driving member is pivotally moved clockwise by applying a suitable operating force to the link 12. As a consequence the driven member will be pivoted in a counterclockwise direction until it reaches a stopped position as shown in Fig. 2. In this position, it will be seen that the associated pin 14 has moved out of the last indentation 13 and is beginning to move behind the associated finger 19. Continued movement of the driving member A will not result in additional movement of the driven member, but will only be effective in seating the pin 14 in the bottom of the notch 18 in which it is positioned, as shown in Fig. 3. Thus further concerted movement of the driving and driven members in the direction under consideration is prevented.

The relative positions of the driving and driven members, as shown in Fig. 3, constitute a locked position, since the pin 14 is seated in the notch 18 so that the independent movement of the driven member in either a clockwise or counterclockwise direction is prevented. However, reversed movement of the driven member is readily accomplished by actuation of the driving member in a counterclockwise direction as clearly indicated in Fig. 4.

As shown in Fig. 4, counterclockwise movement of the driving member causes relative movement of the pin 14, which is in the notch 18, so that it is now positioned at the entrance to the associated adjacent indentation 13, as shown. At the same time, the leading edge of the plate 10 is moved against the end pin 14, whereupon the disc 15 will start to move in a clockwise direction, and the pin 14 will enter the adjacent indentation 13, this position being shown clearly in Fig. 5. If the driving member A movement is continued in a counterclockwise direction, the driven member B will continue to be moved in a clockwise direction until the other limit of movement is reached, whereupon the same locking and limiting operation becomes effective.

Although only the locking operation has thus far been explained which takes place at the limits of movement, provision is also made for locking the driven member against independent reversed direction of movement at other points between the limit positions, as will now be explained. Assuming for example that the driving member and driven member are in the intermediate or midposition, as shown in Fig. 1, it will be observed that upon moving the driving member, in either direction, the pin 14 which is in the indentation 13 will be carried to a position where it is over a shoulder 20. At such position, the shoulder 20 acts to lock the associated pin 14 against reversed movement by independently endeavoring to pivot the driven member.

The mechanical movement as described in the foregoing is adapted for general application, and due to the limiting and locking feature, the movement is especially useful in connection with charging equipment, tool carriers, etc., wherein it is usually desired to utilize a limited movement, and wherein the parts are locked against reverse movement, except by operation of the driving member. It will, of course, be appreciated that the driving and driven members may be readily designed to obtain whatever limited pivotal movement is desired. However, for a predetermined limited movement, installation conditions may require slight increase or decrease of such limited movement. In the disclosed embodiment of the invention, such adjustment is accomplished in a unique manner by an arrangement which will now be described, wherein the pivot 11 may be relatively moved with respect to the plate 10 so as to vary the effective operating lever arms between the pivot 11 and the connection of link 12 to the plate, and between the pivot 11 and the engaged pin 14 of the disc 15.

More specifically, this adjusting feature is accomplished by positioning the pivot 11 within an elongate slot 21, as shown in Fig. 1. The position of the pivot 11 within the slot 21 is adjusted by means of a swingable cam plate 22 which is pivotally mounted on the plate 10 by a pivot member 23. The cam plate 22 has an arcuate cam slot 24 which is eccentrically positioned with respect to the pivot member 23. The pivot 11 also extends into the slot 24, so that by pivotal adjustment of the cam plate 22, the pivot 11 can be relatively shifted within the slot 21.

As an aid to the adjustment of the position of the pivot 11 within the slot 21, an indicating mark, as shown at 25, is provided on the plate 22, and this mark is associated with an arcuate scale 26 on the plate 10. In the disclosed example, the adjustment of the cam plate 22, which corresponds with the mid-position of the pivot 11 in the slot 21, is indicated by a "zero." Thus, adjustments of the pivot 11 either way from the midposition in the slot 21 will be indicated by the graduations of the scale 26. Suitable means may be provided for securing the cam plate 22 in adjusted position. In the present instance, the pivot member 23 has been shown as comprising a bolt having an associated nut 27 to permit loosening for adjustment and tightening to retain the cam plate 22 in adjusted position.

Referring to Figs. 6 and 7, the respective positions of the cam plate 22 are shown for obtaining the smallest angle of pivotal movement of the driven member B, and the largest angle of movement of the driven member B.

The foregoing arrangement for adjusting the angular movement of the driven member is not adapted for use in those cases where it is desired or necessary to utilize a constant non-variable movement of the power actuating device, and yet be able to obtain different angular movements of the driven member. For example, if the power device has motion limiting means such as limit switches, etc. then the operating lever arm between the pivot 11 and the connection of link 12 to the plate should not properly be varied as in the arrangement previously described, but should be maintained of constant length.

An arrangement incorporating the latter feature is shown in Fig. 8, wherein it will be noted that instead of utilizing a pivoted cam plate 22, a substantially rectangular plate 28 is supported on the surface of plate 10 for end-to-end reciprocable movements between spaced guide rails or strips 29 which are welded or otherwise suitably secured to the plate 10.

The plate 28 is arranged with an elongate slot 30 which angularly intercepts one of the two relatively short parallel slots 31—31 in the plate 10 and cooperates therewith to provide registering openings for receiving a pivot pin 32. A bolt 33 is positioned in the other slot 31 and cooperates with pin 32 to secure the plate to a bracket 33' having a power coupling lug 34 projecting therefrom to which the previously described link 12 may be connected. Pin 32 constitutes in this case the pivot support for the plate 10, the pin being rotatable in a suitable stationary bearing 34' carried by the adjacent frame structure.

With this arrangement, it will be seen that end-to-end adjusting movements of the plate 28 will cause the pin 32 and bolt 33 to be simultaneously shifted along their associated slots 31. In so doing, the length of the lever arm between the pivot 32 of plate 10 and the point of power connection by link 12 to power lug 34 will be maintained at a constant value, while the distance from the pivot 32 of plate 10 to the engaged pin 14 of the driven member will be varied so as to change the angular movement of the driven member.

Referring now to Fig. 10 of the drawings, a modified embodiment of the invention will now be described in which the mechanical movement together with an expansible and contractable power link are mounted on a structure, such as a tiltable platform, for adjusting its position; the mechanical movement and parts being carried by the structure.

As schematically illustrated in Fig. 10, the structure is indicated by the numeral 35, and is supported for tilting or swinging movement about a pivot point 36. The structure has three pivotal centers $a$, $b$, and $c$ fixedly positioned thereon in generally triangular relationship.

In this modified arrangement, similar numerals, where possible, have been utilized to indicate elements which correspond with those previously described. Instead of the driven member being associated with a shaft as in the previous arrangement, in the present instance the driven member B is supported for pivotal movement on a suitable pivotal support at the pivot center $a$. The driving member A is pivotally supported on its pivot 11 at the pivot center $b$, and the link 12 in this case connects the driving member with a hydraulic power cylinder 37 which has its other end connected with the pivotal center c. An expansible and contractable linkage is therefore operative to actuate the driving member A.

In the modified arrangement, the driving member A is provided with a T-slot as generally indicated at 38 which, in this case, defines the recess or indentation 13 and shoulders 20—20 as previously explained. The T-slot is associated with a pin 14 as previously explained, and the driving connection in this case operates in the same manner as in the previously described arrangement, except that the angle of movement of the driving and driven members is reduced.

The present arrangement additionally includes a projecting member or arm 39 which is relatively fixed with respect to the driven member and is rotatable therewith. The outermost end of this arm is arranged to bear or slidingly engage a support or surface as generally indicated by the numeral 40. As shown, the horizontal position of the structure 35, and the operative position of the actuating mechanism elements are shown in full lines, while the tilted or shifted position has been illustrated in dotted lines with the parts indicated by primed numbers.

Briefly the operation of the modified arrangement will be as follows: assuming that the parts are as shown in full line position, it will be noted that the structure is locked against movement due to the location of the pin 14 in the T-slot, except by actuation of the driving member A. In this position, it will be noted that the arm 39 makes a very acute angle with the surface 40.

The structure 35 may now be tilted by activating the hydraulic power cylinder 37 so as to cause an expansion of the linkage between pivot center c and the connection of link 12 with the driving member A. This action causes the driving and driven members to swing about their pivots, during which movement the pin 14 passes into the indentation 13 at the mid-position of the members, and as the movement continues the pin 14 passing into the opposite end of the T-slot above the associated shoulder 20. At both positions of operation of the driving and driven members, these members are locked as previously explained.

During the foregoing actuation of the driving member A, the arm 39 is likewise shifted so that it is moved to an obtuse angular position 39', with reference to the surface 40, and the other parts of the actuating mechanism are carried along with the structure 35 to its position 35', wherein the parts of the actuating mechanism are shown in dotted lines. The driving and driven members are locked in this position.

In order to return the structure 35' to full line position, the connecting linkage is contracted by energizing the hydraulic power cylinder so that it operates to shorten the linkage.

Various modifications may suggest themselves to those skilled in the art without departing from the spirit of my invention, and, hence, I do not wish to be restricted to the specific form or forms as shown or uses mentioned, except to the extent indicated in the appended claims.

I claim:

1. An actuating mechanism, comprising: a pivotally mounted driving member having a plurality of peripheral lobes separated by inwardly extending indentations; a pivotally mounted driven member having spaced projections adjacent its periphery adapted to successively enter said indentations upon concerted movement of said members; hook means carried by one of said lobes engageable with a pin entering an adjacent indentation, initial engagement with the pin acting to arrest further pivotal movement of the driven member, and further movement of the driving member moving the hook to a locking position restraining the driven member against independent reversal of said pivotal movement, but enabling reversed driving movement by said driving member.

2. An actuating mechanism, comprising: a pivotally mounted driving member having a plurality of peripheral lobes separated by inwardly extending indentations; a pivotally mounted driven member having spaced pins adjacent its periphery adapted to successively enter said indentations upon movement thereof; and a hook carried by one of said lobes for lockingly engaging a pin entering an adjacent indentation upon pivotal movement of the driving member and restraining independent pivotal movement of the driven member, but enabling reversed movement by said driving member.

3. An actuating mechanism, comprising: a pivotally mounted driving member having a plurality of peripheral lobes separated by inwardly extending indentations; a pivotally mounted driven member having spaced pins adjacent its periphery adapted to successively enter said indentations upon movement thereof; and hook means carried by one of said lobes for engaging a pin entering an adjacent indentation, whereby continued movement of the driven member is arrested.

4. An actuating mechanism, comprising: a pivotally mounted driving member having a peripheral section containing a plurality of lobes separated by inwardly extending indentations; a pivotally mounted driven member having spaced pins adjacent its periphery adapted to enter the indentations between said lobes and form a motion transmitting connection between said members; and lateral notches in the indentations respectively adjacent the ends of said section for lockingly receiving a pin therein so as to limit continued movement of said members beyond the limits of said section.

5. An actuating mechanism, comprising: a pivotally mounted driving member having a peripheral section containing spaced lobes; a pivotally mounted driven member having spaced pins adjacent its periphery adapted to enter the spaces between said lobes and form a motion transmitting connection between said members; and means at the opposite ends of said peripheral section for respectively engaging one of said pins so as to limit continued movement of said driven member.

6. An actuating mechanism, comprising: a pair of pivotally mounted members interconnected to form a driving member and a driven member respectively, the driving member having a slot in which its pivot is laterally shiftable; means for limiting the concerted movement of said members; a cam member movably mounted on the driving member having a cam slot in which said pivot is positioned, movement of the cam member acting to shift said pivot and regulate the relative amounts of pivotal movement of the driving and driven members, and means associated with said cam member for indicating its position of adjustment.

7. An actuating mechanism, comprising: a pair of pivotally mounted members interconnected to form a driving member and a driven member respectively, the driving member having a slot in which its pivot is laterally shiftable; means for limiting the concerted movement of said members; and a cam member movably mounted on the driving member having a cam slot in which said pivot is positioned, movement of the cam member acting to shift said pivot and regulate the relative amounts of pivotal movement of the driving and driven members.

8. An actuating mechanism, comprising: a pair of pivotally mounted members interconnected to form a driving member and a driven member respectively; means carried by said members movable into a pivotal movement limiting and locking position upon concerted pivotal movement of said members a predetermined extent; and a cam adjustable to relatively shift the driving member and its pivot mounting, so as to regulate the relative amounts of pivotal movement of said members.

9. An actuating mechanism, comprising: a pair of pivotally mounted members interconnected to form a driving member and a driven member respectively; means carried by said members movable into a pivotal movement limiting and locking position upon concerted pivotal movement of said members a predetermined extent; and means carried by one of said members for regulating the relative amounts of pivotal movement of said members.

10. An actuating mechanism, comprising: a pair of pivotally mounted members interconnected to form a driving member and a driven member respectively; and mutually co-acting parts carried by said members movable into a position limiting and locking said driven member against continued or reversed pivotal movement, upon pivotal movement of said members a predetermined extent.

11. An actuating mechanism, comprising: a pivotally mounted driving member; a pivotally mounted driven member; a motion transmitting connection between said members including an indentation in one of said members; a pin carried by the other of said members movable into and out of said indentation during concerted movements of said members by the driving member; and an offset shoulder engageable by said pin for locking the pin against reversed independent movement by its associated member.

12. The combination with a structure supported for tilting movement about a pivot, of actuating mechanism for moving said structure between angularly related positions, said mechanism comprising: three relatively fixed pivotal centers on said structure; a pair of members mounted for pivotal rotation respectively about two of said centers and interconnected to form a driving member and a driven member; an arm connected at one end to the driven member for rotation therewith, and at its other end having a swingable connection with a support; and a variable length link having pivotal end connections respectively with the third pivotal center and the driving member, whereby length variations in said link will actuate said driving and driven members and angularly move said structure.

13. The combination with a structure supported for tilting movement about a pivot, of actuating mechanism for moving said structure between angularly related positions, said mechanism comprising: three relatively fixed pivotal centers on said structure; a pair of members mounted for pivotal movement respectively about two of said centers and interconnected to form a driving member and a driven member; an arm connected at one end to the driven member for movement therewith and at its other end having a swingable connection with a support; a variable length link having pivotal end connections respectively with the third pivotal center and the driving member, whereby length variations in said link will actuate said driving and driven members and angularly move said structure; and motion limiting means carried by said members cooperative upon predetermined movement thereof to lock the driven member against independent movement, but enable reversed movement thereof by said driving member.

14. The combination with a structure supported for tilting movement about a pivot, of actuating mechanism for moving said structure between angularly related positions, said mechanism comprising: three relatively fixed pivotal centers on said structure; a pair of members mounted for pivotal movement respectively about two of said centers and interconnected to form a driving member and a driven member; an arm connected at one end to the driven member for movement therewith and at its other end having a swingable connection with a support; and a variable length link including hydraulic power cylinder means having pivotal end connections respectively with the third pivotal center and the driving member, whereby length variations in said link will actuate said driving and driven members and angularly move said structure.

15. The combination with a tiltable structure of mechanism carried thereby for angularly shifting said structure with respect to a reference surface, comprising: three pivotal centers in triangular relationship carried by said structure; a driving member pivoted at one of said centers; a driven member pivoted at another of said centers and having an extension in engagement with said surface; a driving connection between said members; and a power expansible and contractable link for actuating said driving member, said link being connected at one end to the remaining center and at its other to the driving member, whereby the driven member may be pivoted in opposite directions to tiltingly move said structure by changing the position of said extension.

16. An actuating mechanism, comprising: a pair of pivotally mounted members interconnected to form a driving member and a driven member respectively; a power actuating connection to said driving member; and means adjustable to shift the power actuating connection and pivot of the driving member while maintaining a constant spacing between said connection and driving member pivot to a plurality of positions.

17. An actuating mechanism, comprising: a pair of pivotally mounted members interconnected to form a driving member and a driven member respectively, the driving member having a slot; means for connection with a power actuating device, said means being laterally shiftable in said slot and including a pivot for the driving member; and camming means carried by the driving member for adjustably shifting said means.

18. An actuating mechanism, comprising: a pair of pivotally mounted members interconnected to form a driving member and a driven member respectively, the driving member having a pair of spaced parallel slots; a pivotally mounted power connection bracket forming a pivotal support for the driving member, said bracket being supported so as to be laterally shiftable in said slots; and a plate supported on said driving member for endwise adjustable movements, said plate having a slot crossing one of the slots in the driving member at an angle and adapted to adjustably position the bracket with respect to said driving member.

19. An actuating mechanism, comprising: a pair of pivotally mounted members interconnected to form a driving member and a driven member respectively; means mounting the pivot of the driving member for relative lateral movement with respect to the driving member to a plurality of fixed operating positions; a power actuating connection to said driving member; and means adjustable to shift the pivot of the driving member to said positions to selectively vary the driving ratio between said members and the consequent relative pivotal movement of the driven member.

References Cited in the file of this patent

UNITED STATES PATENTS

| | | |
|---|---|---|
| 1,609,292 | Burch | Dec. 7, 1926 |
| 1,708,520 | Proksa | Apr. 9, 1929 |
| 1,783,340 | Oliver | Dec. 2, 1930 |
| 1,849,327 | Hueber | Mar. 15, 1932 |
| 1,902,266 | Ripp | Mar. 21, 1933 |
| 2,246,034 | Elison | July 17, 1941 |
| 2,520,628 | Elsner | Aug. 29, 1950 |
| 2,627,188 | Gaubatz | Feb. 3, 1953 |
| 2,655,812 | Morrison | Oct. 20, 1953 |